June 19, 1962     A. M. WARN     3,039,424
SAFETY ALARM SIGNALS FOR VEHICLES
Filed Dec. 5, 1960
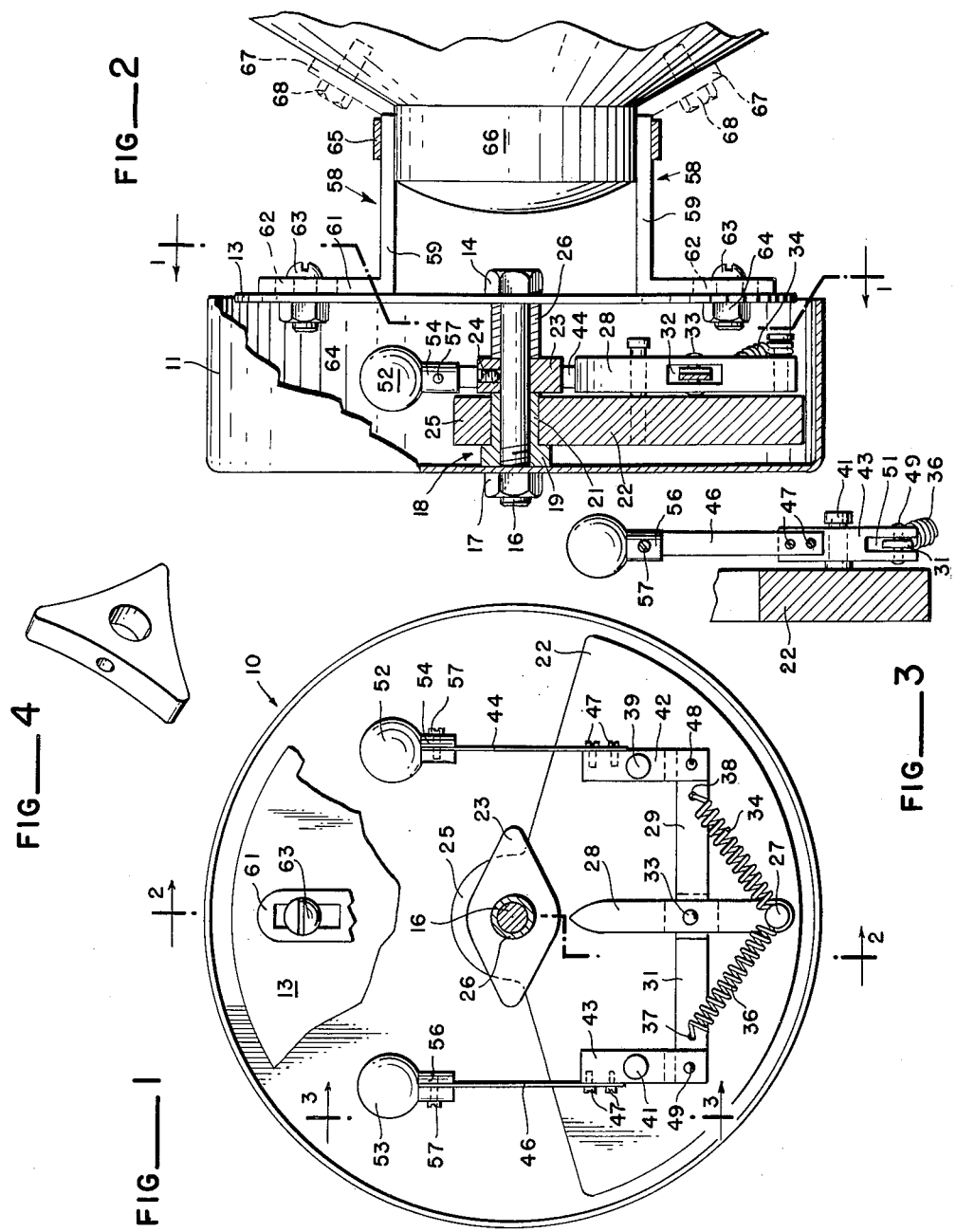
INVENTOR.
ARTHUR M. WARN
BY
ATTORNEY

United States Patent Office 3,039,424
Patented June 19, 1962

3,039,424
SAFETY ALARM SIGNALS FOR VEHICLES
Arthur M. Warn, 18221 Pacific Highway S., Seattle, Wash.
Filed Dec. 5, 1960, Ser. No. 73,710
3 Claims. (Cl. 116—60)

This invention relates to new and useful safety signalling devices for vehicles.

The broad object of this invention is to provide a safety alarm signal for vehicles such as trucks, tractors, fork-lift trucks and the like, operated in areas in which there are people exposed to the danger of being struck by a vehicle. For example, loading and unloading docks and platforms, warehouses and stockrooms may require the use of such vehicles where people are likely to be moving about afoot. This device, attached to a vehicle wheel, will provide a warning to people nearby who may be engaged in other activity or whose attention may be diverted away from the dangers of a nearby moving vehicle. Similarly this device is designed to warn individuals whom the driver may have failed to see.

More specifically this invention has as its object to provide a vehicle with a safety alarm signal which produces a continuous audible alarm regardless of the direction of travel of the vehicle.

Another object is the provision of a signalling device of the character described which is entirely self-contained, requiring no electrical, mechanical, hydraulic or other external power or motive connections, and which, despite the fact that it contains movable parts, requires only rigid attachment to the vehicle wheel. In general, the motive power is provided by relative movement between certain parts which revolve with a wheel of the vehicle and certain other parts which are restrained against rotation by a counter; pendulum; or eccentric-type weight.

Another object of this invention is to provide a safety alarm signal for vehicles which is simple and economical in construction, efficient and dependable in operation, and readily adaptable to any type of vehicle moving on wheels.

With these objects in view, as well as other objects which will appear in the course of the specification, reference may be had to the following drawings, wherein:

FIGURE 1 is a rear elevational section view of the device taken along line 1—1 of FIG. 2;

FIGURE 2 is a side elevational section view of the device taken along line 2—2 of FIG. 1;

FIGURE 3 is a side elevational view in partial section taken along line 3—3 of FIG. 1, portions being broken away or omitted for convenience of illustration;

FIGURE 4 is a perspective view of an alternate cam shown for illustrative purposes.

The Bell

Referring to the drawings in detail it will be seen that the embodiment of the invention illustrated comprises a sounding bell 10, in the form of a shallow steel cylinder closed at one end and open at the other end. However, the bell may also be of other shapes. Furthermore, it is contemplated that the bell may be made of metals other than steel.

Bell 10 comprises circular end wall 12 having a flange or cylindrical side wall 11 around its edge. Bell 10 is apertured at its axis to receive shaft 16 of bolt 14. Within bell 10 and abutting end wall 12 is a bushing 18 and which is slidably received on shaft 14. Also within bell 10 and pivotally mounted on bushing 18 is weight 22 having a hub portion 25 apertured to rock or swing on bushing 18. Note that the generally cylindrically shaped bushing has flange 19, which serves to space weight 22 from end wall 12. The cylindrical or sleeve portion 21 of bushing 18 serves as the journal for weight 22.

The Counterweight

The mass of weight 22 is disposed eccentrically of shaft 16. Since the weight normally hangs downward because of gravity, it prevents parts attached to it from rotating as the shaft turns. The weight 22 may be of any form or contour so long as it contains enough mass below the hub to counterbalance forces of friction, and the weight of the striker heads 52 and 53 and their supporting structure. Preferably weight 22 is formed of heavy plate metal and is less than fully semi-circular in shape as can be seen in FIG. 1.

Bushing 18 may be formed of plastic or other synthetic compositions, or of metal such as brass, all of which should be suitable bearing material. The sleeve or cylindrical portion 21 of the bushing, as can be seen, is slightly longer than weight 22 is thick so that said weight has limited axial movement on sleeve 21 in order that it may retain its free pivotability.

Actuating Cam

An interchangeable cam 23, which functions as the actuating means for the striker heads and which will be more fully described hereinafter, is mounted on shaft 16. Cam 23 is two-lobed. FIG. 4 illustrates an alternative three-lobed cam which may be used with this signal device. It will be apparent that the actuating cam may be provided with any number of lobes. The cams, of course, as with bushing 18, may be made of a wide variety of materials such as hard wood, metal, plastic or other synthetic compositions which are essentially non-resistant. Cams 23 or 24 are of course, ported to be slidably received on shaft 16. Although it is not absolutely necessary cam 23 may be securely connected to shaft 16 by virtue of a lock screw 24.

A spacer sleeve 26, which is also slidably received on shaft 16, abuts cam 23. One end of sleeve 26 fits snugly against the cam while the other end abuts firmly against supporting plate 13 which is also apertured to be received on shaft 16. When nut 17 is threaded tightly on shaft 16, bell 10, bushing 18, cam 23, sleeve 26 and supporting plate 13 are securely bound together as a single rigid unit.

Clapper Mechanism

Weight 22 is less than fully semi-circular in shape as can be seen in FIG. 1. Near the lower periphery of and located on the center line running radially through weight 22 is pivot shaft or stud 27 outstanding perpendicular to the face of said weight. Said stud 27 is integrally connected to said weight. Follower arm 28 is pivotally mounted on stud 27 and from said stud extends generally upward. The end of follower arm 28 is engaged by the lobes of cam 23 and is shaped in the form of a blunt or rounded point. The end or point of follower 28 is spaced a slight distance from the hub of cam 23 when out of engagement with the cam lobes. A clevis slot 32 is cut through the width of follower 28 in a plane coincident with the plane in which the follower pivots. The center of slot 32 is slightly below the center of follower 28. Extending through the walls of clevis slot 32, perpendicular to the face of weight 22, is clevis pin 33. Actuating arms or linkage bars 29 and 31 are inserted into and overlap within slot 32 and are pivotally mounted on pin 33. Arms 29 and 31 are somewhat shorter in length than follower 28. The arms 29 and 31, as may be seen in FIG. 3, are approximately the same width as follower 28 but of necessity considerably less thick since both must be free to pivot within the clevis slot 32 on pin 33.

Pivot shafts or studs 39 and 41 are laterally located on radius lines which are approximately 45° on either side of the radius line on which stud 27 lies. Studs 39 and 41 outstand from the face of weight 22 at points slightly greater than midway from the axis of shaft 16 to side wall 11 of bell 10. Apertured approximately at their medians to be pivotally mounted on studs 39 and 41, are rigid supporting arms 42 and 43, which are approximately of the same thickness as follower 28 and are slotted at their lower ends, as at 51 in FIG. 3, to receive actuating arms or linkage bars 29 and 31 respectively. Actuating arms 29 and 31 are pivotally connected to supporting arms 42 and 43 by pins 48 and 49. The arms 42 and 43 extend upwardly substantially parallel to and to about the same height as the upper end of follower 28. Coil springs 34 and 36 are secured to actuating arms 29 and 31 through small apertures 37 and 38 which are spaced a short distance from supporting arms 42 and 43. The opposite ends of springs 34 and 36 are attached to stud 27. Springs 34 and 36 serve to bias the follower and its related structure to the neutral position shown in FIG. 1 in which the follower is seen to lie astride a radial line running through the axis of shaft 16 and stud 27.

Attached to each rigid supporting arm 42 or 43 by screws 47 is a flexible striker arm 44 or 46 respectively which is preferably formed of leaf-spring stock. The striker arms 44 and 46 can be seen to be attached to said rigid supporting arms above the aperture which receives stud 39 or 41. The flexible striker arms extend generally upwardly and are slightly greater in length than rigid supporting arms 42 and 43.

Clappers or striker heads 52 and 53 have the base portions 54 and 56 which are slotted to straddle the upper ends of arms 44 and 46. The connections between the base portions and the flexible striker arms are made secure by screws 57. Constructed as described the movable supporting framework for the striker heads locates the striker heads outwardly above the cam 23 and in striking relation to the bell sidewall 11.

The manner in which the invention is attached to the vehicle is shown in FIG. 2. Supporting plate 13 is designed to be in radially spaced relation to the open end or edge of side wall 11, and securely attached, as described above, to shaft 16 of bolt 14. In addition to its support function, and because it substantially covers the open end of the bell, plate 13 also serves to protect the operation of moving parts within bell 10 from being impaired and obstructed with grease and dirt and other deleterious matter. It is contemplated that shaft 16 may be integrally connected to plate 13, as, for example, by welding it thereto.

*Support Apparatus*

In order to support the invention on the wheel hub 66 of the particular vehicle it is necessary to fashion three or four brackets, identical to brackets 58 shown for illustrative purposes, and spaced at either 90° or 120° intervals as may be determined expedient by a person skilled in the art. Brackets 58 have legs 59 and at right angles thereto legs 61. Legs 61 are provided with slots 62 for the purpose of permitting precise adjustment of the invention on the wheel hub 66. It should be noted that the axis of bell 10 and shaft 16 should be as nearly as possible coaxial with the axis of hub 66. Securing brackets 58 to the plate 13 are bolts 63 and nuts 64. Assembled as described this invention forms a rigid unit ready for attachment to the vehicle hub.

Legs 59 may be secured to hub 66 by strapping said legs thereto with steel strap 65 having an appropriate tightening or cinching mechanism (not shown). Alternatively, the brackets 58 may be shaped so that third legs such as legs 67, shown in dotted lines, would fit the contour of the wheel to be attached thereto by bolts or screws 68.

*Mode of Operation*

The operation of the safety alarm signal is the same regardless of the direction of travel of the vehicles. As the device rotates with the wheel, weight 22 retains as a result of gravity a substantially non-rotary position below shaft 16. Thus, the follower 28, the striker head actuating structure, and the striker heads themselves are also restrained against rotation. The lobes of cam 23, however, in rotating with bell 10 move into contact with follower 28 and force said follower to one side or the other against the force exerted by one or the other of the coil springs 34 and 36. For example, if the alarm rotates clockwise follower 28 is pivoted left as viewed in FIG. 1. Actuating bar 31 is moved left swinging the lower end of arm 43 left which in turn swings striker head 53 to the right. At the same time, actuating arm 29 is moved left forcing the lower portion or arm 43 left around its pivot 39. Thus, the striker head 52 is forced left and into contact with side wall 11 to produce the audible alarm signal. The striker head 53 produces the alarm signal if the direction of rotation is reversed. As the cam continues to rotate the springs 34 and 36 force the follower 28 back to its central position until the next lobe is rotated to contact said follower. The number of alarm signals sounded in a single revolution is determined by the number of lobes on the particular cam employed.

It will be understood that the showing of the device is very diagrammatic and that the invention is capable of many refinements which will readily occur to those skilled in the art. The actuating structure to which the follower 28 and the striker heads are connected need not be in the precise position, nor constructed, exactly as shown. The cams employed in this invention may be provided with lobes of varying size so that each strike of the clapper during a single rotation gives a different tone. It is also contemplated that this invention may also be used on vehicles which run on tracks and on machinery such as gears and other wheels. In short this invention has application to most any type of body which rotates, the turning of which should be accompanied by a safety alarm signal. It is obvious that many variations in the form of the follower and actuating structure or frame could be used without departing from the spirit of the invention. It is intended, therefore, not to be limited except as indicated by the scope of the subjoined claims.

What is claimed is:

1. A vehicular signal alarm for sounding a continuous audible warning of wheel rotation in either direction of travel, comprising:
   (a) a shaft for coaxial rotation with a wheel;
   (b) a bell fixedly mounted on said shaft for rotation therewith;
   (c) a weight pivotally mounted on said shaft within said bell and depending from said shaft in a relatively stationary position under the force of gravity;
   (d) a cam fixedly secured to said shaft for rotation therewith;
   (e) a cam follower projection pivotally mounted on said weight and extending generally upwardly toward said cam;
   (f) a striker head flexibly and pivotally mounted on said weight on each side of said follower projection in striking relation to said bell;
   (g) a spring means biasing said projection to a neutral position in which the upper end of said projection is slightly spaced from said cam but adapted to be engaged by the lobes on said cam as said cam rotates; and
   (h) a linkage means connecting said projection and said striker heads whereby as said cam rotates and engages said projection pivots causing said striker heads to pivot and to move one of said heads into contact with said bell.

2. A vehicular signal alarm for sounding a continuous audible warning of wheel rotation in either direction of travel, comprising:
   (a) a shaft for coaxial rotation with a wheel;

(b) a bell fixedly mounted on said shaft for rotation therewith;
(c) a weight pivotally mounted on said shaft within said bell and depending from said shaft in a relatively stationary position under the force of gravity;
(d) a cam fixedly secured to said shaft for rotation therewith;
(e) a cam follower projection pivotally mounted on said weight and extending generally upwardly toward said cam;
(f) rigid supporting arms pivotally mounted on said weight on each side of said follower projection;
(g) a striker head flexibly mounted on each of said supporting arms and in striking relation to said bell;
(h) a spring means biasing said projection to a neutral position in which the upper end of said projection is slightly spaced from said cam but adapted to be engaged by the lobes on said cam as said cam rotates;
(i) linkage means connecting said projection and said supporting arms whereby as said cam rotates and engages said projection said projection pivots causing said supporting arms to pivot and to move one of said heads into contact with said bell.

3. A vehicular signal alarm for sounding a continuous audible warning of wheel rotation in either direction of travel, comprising:
(a) a shaft for coaxial rotation with a wheel;
(b) a bell fixedly mounted on said shaft for rotation therewith;
(c) a weight pivotally mounted on said shaft within said bell and depending from said shaft in a relatively stationary position under the force of gravity;
(d) a cam fixedly secured to said shaft for rotation therewith;
(e) a cam follower projection pivotally mounted on said weight and extending generally upwardly toward said cam;
(f) a pair of rigid supporting arms, each of said arms being pivotally mounted on said weight on one side of said follower projection;
(g) a striker head flexibly mounted on each of said supporting arms and in striking relation to said bell;
(h) spring means biasing said projection to a neutral position in which the upper end of said projection is slightly spaced from said cam but adapted to be engaged by the lobes on said cam as said cam rotates;
(i) a pair of linkage bars each of which connects said projection with one of said supporting arms and each of which is pivotally connected to said projection and to one of said linkage bars whereby as said cam rotates and engages said projection pivots causing said supporting arms to pivot to move one of said heads into contact with said bell.

References Cited in the file of this patent
UNITED STATES PATENTS

| 716,471 | Pickop et al. | Dec. 23, 1902 |
| 2,802,441 | Epstein | Aug. 13, 1957 |